United States Patent
Wang et al.

(10) Patent No.: US 11,920,052 B2
(45) Date of Patent: Mar. 5, 2024

(54) WATERBORNE, UV CURABLE COATING COMPOSITION FOR EASY-CLEAN COATINGS

(71) Applicant: Akzo Nobel Coatings International B.V., Amsterdam (NL)

(72) Inventors: Jianhui Wang, Shanghai (CN); Zhenglin Xu, Shanghai (CN); Hong Lin, Guangdong (CN)

(73) Assignee: Akzo Nobel Coatings International B.V., Amsterdam (NL)

( * ) Notice: Subject to any disclaimer, the term of this patent is extended or adjusted under 35 U.S.C. 154(b) by 130 days.

(21) Appl. No.: 17/629,823

(22) PCT Filed: Jul. 29, 2020

(86) PCT No.: PCT/EP2020/071359
§ 371 (c)(1),
(2) Date: Jan. 25, 2022

(87) PCT Pub. No.: WO2021/018946
PCT Pub. Date: Feb. 4, 2021

(65) Prior Publication Data
US 2022/0259455 A1 Aug. 18, 2022

(30) Foreign Application Priority Data

Aug. 1, 2019 (WO) ............... PCT/CN2019/098827
Oct. 28, 2019 (EP) .................................... 19205626

(51) Int. Cl.
*C09D 171/02* (2006.01)
*C08G 65/332* (2006.01)
*C09D 7/20* (2018.01)

(52) U.S. Cl.
CPC ....... *C09D 171/02* (2013.01); *C08G 65/3326* (2013.01); *C09D 7/20* (2018.01)

(58) Field of Classification Search
CPC ..... C09D 171/02; C09D 7/20; C08G 65/3326
USPC .................................................... 428/412
See application file for complete search history.

(56) References Cited

U.S. PATENT DOCUMENTS

| | | | |
|---|---|---|---|
| 11,299,586 B2 * | 4/2022 | Wang | C08G 65/3322 |
| 2013/0075632 A1 | 3/2013 | Cho et al. | |
| 2016/0201005 A1 | 7/2016 | Nowak et al. | |
| 2019/0077985 A1 * | 3/2019 | Kanda | C09D 7/40 |

FOREIGN PATENT DOCUMENTS

| | | |
|---|---|---|
| CN | 106047090 A | 10/2016 |
| CN | 106189731 A | 12/2016 |
| CN | 106366866 A | 2/2017 |
| CN | 107141867 A | 9/2017 |
| CN | 108300274 | 7/2018 |
| EP | 0556771 A1 | 8/1993 |
| EP | 0622391 A2 | 4/1994 |
| WO | WO2001/10954 A1 | 2/2001 |
| WO | WO2005/061638 A1 | 7/2005 |
| WO | WO2016/171086 A1 | 10/2016 |
| WO | WO2017/111984 A1 | 6/2017 |
| WO | WO2019/129691 A1 | 4/2019 |

OTHER PUBLICATIONS

Translation of CN106047090A.
English Translation of CN106189731A.
English Translation of CN106366866A.
English Translation of CN107141867A.
English Translation of WO2016171086A.
Search Report of Corresponding Application No. EP 19205626.5, dated Mar. 30, 2020.
Search Report and Written Opinion of Corresponding International Application No. PCT/EP2020/071359, dated Sep. 18, 2020.
Search Report and Written Opinion of Corresponding International Application No. PCT/CN2019/098827, dated Apr. 30, 2020.
"International Preliminary Report on Patentability," for PCT Application No. PCT/EP2020/071359 dated Feb. 1, 2022 (7 pages).

* cited by examiner

*Primary Examiner* — Hui H Chin
(74) *Attorney, Agent, or Firm* — Pauly, DeVries Smith & Deffner LLC

(57) ABSTRACT

The present disclosure relates to an aqueous dispersion of a carboxyl-functional, unsaturated polyester containing a perfluoropolyether block prepared by the following steps: a) subjecting a carboxyl-terminated perfluoropolyether C to a reaction with an ethylenically unsaturated epoxy-functional compound D in the presence of compound E, wherein compound E is a carboxylic acid or anhydride with functionality of at least 2, to obtain carboxyl-functional, unsaturated polyester F, and b) neutralizing carboxyl-functional, unsaturated polyester F with a neutralizer G and dispersing it in water. The dispersion can be used to prepare a waterborne, UV-curable coating composition and used for easy-clean coatings for various substrates.

15 Claims, No Drawings

WATERBORNE, UV CURABLE COATING COMPOSITION FOR EASY-CLEAN COATINGS

CROSS-REFERENCE TO RELATED APPLICATIONS

This application is a 35 U.S.C. § 371 national phase application of PCT Application No. PCT/EP2020/071359 (WO 2021/018946 A1), filed on Jul. 29, 2020, which claims the benefit of priority to International Application No. PCT/CN2019/098827, filed Aug. 1, 2019 and EP Application No. 19205626.5, filed on Oct. 28, 2019, each of which is incorporated herein by reference in its entirety.

FIELD OF THE INVENTION

The present invention relates to an aqueous dispersion of an unsaturated polyester and a waterborne, UV curable coating composition containing the same. The coating composition can be used for producing easy-clean coatings, which are particularly useful in the field of consumer electronics or automotive interiors.

BACKGROUND

In the field of consumer electronic devices such as cellular phones, tablets, laptops, and automotive interiors various substrates are used, such as plastics, metal and glass. It is often desired to cover these substrates with easy-clean and stain resistant coatings. Easy-clean means that that the surface is repellent to water, oil and/or dirt. Easy-clean coatings reduce or eliminate the need to clean the surface.

It is known in the art that fluorinated polymers, particularly, perfluoropolyether (PFPE), have non-stick and lubricating properties and can be used to create easy-clean coatings. However, such resins are only soluble in fluorinated solvents and thus difficult to use in coating formulations without the use of special solvents. The problem is even bigger when one wants to use such resins in waterborne coating compositions, since fluorinated resins typically do not disperse well in water. Consequently, the improvement of easy clean property is often accompanied by deterioration of water dispersibility. As a result, most easy-clean coatings are typically solvent-borne.

WO 2019/129691 discloses a polyester resin modified with a perfluoropolyether. The polymer contains both hydroxyl groups and unsaturated bonds and can be cured by both ultraviolet radiation and curing agents. The polymer is particularly useful in preparing coatings with stain resistance, anti-fingerprint and anti-scratching properties.

There is a need to provide easy-clean coating compositions, preferably, waterborne coating compositions. It is also desired that the coatings are durable and can withstand abrasion. It is further desired that the coating adheres well to substrates used in consumer electronics or automotive industries, particularly to plastic substrates.

SUMMARY OF THE INVENTION

In order to address the above-mentioned desires, the present invention provides, in a first aspect, an aqueous dispersion of a carboxyl-functional, unsaturated polyester containing a perfluoropolyether block prepared by the following steps:
a) subjecting a carboxyl-terminated perfluoropolyether C to a reaction with an ethylenically unsaturated epoxy-functional compound D in the presence of compound E, which is a carboxylic acid or anhydride with functionality of at least 2, to obtain carboxyl-functional, unsaturated polyester F,
b) neutralizing carboxyl-functional, unsaturated polyester F with a neutralizer G and dispersing it in water.

In a further aspect, the invention provides a waterborne, UV curable coating composition, comprising the aqueous dispersion according to the invention.

The invention also provides a method of coating a substrate, comprising applying the coating composition according to the invention to a substrate and curing the coating composition by means of UV radiation.

In yet another aspect, the present invention provides a coated substrate obtained according to the invention.

DETAILED DESCRIPTION OF THE INVENTION

The present invention is based on a judicious insight that it is possible to create a polymer, which can be well dispersed in waterborne coating compositions and which provides for easy clean properties of the resulting coating.

The polymer used in the present invention is an unsaturated polyester based on perfluoropolyether (PFPE) resin. It can be prepared by a method comprising the following steps.

Step (a)

In the first step (a), a carboxyl-terminated perfluoropolyether C is reacted with an ethylenically unsaturated epoxy-functional compound D in the presence of compound E, which is a carboxylic acid or anhydride with functionality of at least 2, to obtain carboxyl-functional, unsaturated polyester F. "Ethylenically unsaturated" means in the context of present invention that the compound contains at least one double bond that is reactive in radical polymerization reactions.

Perfluoropolyethers (PFPE) are fluorinated polymers comprising a straight or branched fully or partially fluorinated polyoxyalkylene chain that contains recurring units having at least one catenary ether bond and at least one fluorocarbon moiety. PFPE can be divided into non-functional and functional; the former comprise a PFPE chain whose ends bear (per)haloalkyl groups, while the latter comprise a PFPE chain having at least two ends, wherein at least one end comprises a functional group. Functional PFPEs, in particular mono- and bifunctional PFPE, comprise a PFPE chain having two ends, wherein one or both end(s) bear(s) a functional group. Preferably a bifunctional PFPE is used.

The carboxyl-terminated perfluoropolyethers are functional perfluoropolyethers (PFPE) containing one or more carboxyl groups at each of both ends. The carboxyl group can be present in a free form (COOH), or in the form of a salt, e.g. Na salt, or esterified, e.g. C1-C4 alkyl ester, such as methyl or ethyl ester. Such compounds are known to a skilled person and commercially available as e.g., Fluorolink® from Solvay.

The carboxyl-terminated perfluoropolyether C can be prepared from hydroxy-terminated perfluoropolyethers A, by subjecting it to a condensation reaction with compound B, which is a multifunctional carboxylic acid or anhydride.

Hydroxy-terminated perfluoropolyether A preferably has a number average molecular weight (mn) of from 400 to 3000. Mn can be determined by gel permeation chromatography (GPC) using a polystyrene standard with tetrahydrofuran as the mobile phase.

Hydroxy-terminated perfluoropolyether A can have a general structure HO—(CF$_2$—CF$_2$—O)$_n$—OH or HO—(CF$_2$—CF$_2$—O)$_n$—(CF$_2$—O)$_m$—OH. It can also include blocks with ethylene oxide units and have the general structure:

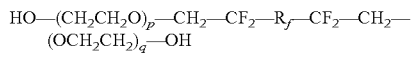

HO—(CH$_2$CH$_2$O)$_p$—CH$_2$—CF$_2$—R$_f$—CF$_2$—CH$_2$—(OCH$_2$CH$_2$)$_q$—OH wherein p and q are integers independently chosen from 0 to 50, preferably from 1 to 50, wherein R$_f$ represents a bifunctional radical having perfluoropolyether structure (CF$_2$CF$_2$O)$_n$, (CF$_2$O)$_m$ or (CF$_2$—CF$_2$—O)$_n$—(CF$_2$—O)$_m$, and wherein n and m are integers independently chosen from 1 to 100. When both p and q are not zero, the resulting polymer has a better dispersibility in water.

Hydroxy-terminated perfluoropolyethers are commercially available from Solvay as Fluorolink® PFPE, or Fomblin® PFPE, e.g. Fluorolink® 5174X, Fluorolink® E10H, Fluorolink® PEG45.

The multifunctional carboxylic acid or anhydride B preferably has functionality of at least 3. Examples of suitable compounds B include trimellitic anhydride, hydrogenated trimellitic anhydride, cis-aconitic anhydride, pyromellitic anhydride and their respective acids. Preferably, compound B is an anhydride. This has as an advantage that the reaction with compound A does not yield water that needs to be removed during the reaction. The reaction is hence easier to control and can be performed at lower temperatures. Preferably, compound B is a tri-functional anhydride, particularly trimellitic anhydride or hydrogenated trimellitic anhydride.

The reaction with compound B can be carried out in the presence of a catalyst. Conventional esterification catalysts known in the art can be used. Preferably, the reaction is carried out in the presence of a metal catalyst, e.g. an organotin compound. More preferably, the catalyst is dibutyltin dilaurate (DBTDL). Other metal catalysts can also be used, such as stannous octoate, zirconium or titanium-based catalysts. The catalyst can be used in an amount from 0.01 to 5 wt. %, or from 0.1 to 1 wt. %, based on the total weight of the reactants excluding solvents.

The reaction with compound B preferably takes place in an organic solvent or a mixture of solvents. Any suitable solvent, non-reactive to the reactants can be used. Examples include esters (such as ethyl acetate, propyl acetate), aromatic solvents (such as toluene), ketone solvents (such as acetone, methyl ethyl ketone, methyl isobutyl ketone, cyclohexanone, diacetone alcohol); aliphatic hydrocarbons; ethers (such as diethyl ether, tetrahydrofuran) and mixtures thereof. Preferred organic solvents include butyl acetate, methyl isobutyl ketone (MIBK), methyl ethyl ketone (MEK), methoxy propyl acetate (PMA), or mixtures thereof.

Skilled person is able to determine suitable conditions for the reaction with compound B. Typically, the synthesis is done in an inert atmosphere, under strong stirring, for a time sufficient for the complete conversion of the hydroxy-terminated PFPE. The temperature during the synthesis is typically in the range 80-150° C., under the conditions to remove water formed during the condensation (e.g. distillation).

It is important to use suitable amounts of the reagents so that the resulting compound C has carboxyl functionality. This is achieved, e.g. by using a relative excess of compound B. Preferably, the molar ratio of compound B to compound A is from 1:1 to 3:1.

Preferably, the acid value of the carboxyl-terminated perfluoropolyether C is in the range 5-60 mg KOH/g, more preferably 10-50 mg KOH/g. The acid value can be measured by potentiometric titration, e.g. in accordance with DIN EN ISO 3682.

The carboxyl-terminated perfluoropolyether C, either as commercially available or as prepared in the above-described reaction, is reacted in step (a) with compounds D and E.

Preferably, the ethylenically unsaturated epoxy-functional compound D is an epoxy-functional (meth)acrylate. Particularly preferred epoxy-functional (meth)acrylates include glycidyl acrylate and glycidyl methacrylate. Preferably, the epoxy-functional (meth)acrylate has molecular weight not higher than 500.

Preferably, the carboxylic acid or anhydride compound E has a functionality of at least 2. In a preferred embodiment, the functionality is equal to 2.

Compound E is preferably added to the reaction mixture before or simultaneously with the addition of compound D, more preferably it is added before compound D.

Examples of suitable compounds E include phthalic anhydride, hexahydrophthalic anhydride, isophthalic anhydride, terephthalic anhydride, glutaric anhydride, 1,2-cyclohexanedicarboxylic anhydride, 4-methyl-1,2-cyclohexanedicarboxylic anhydride, their (alkyl) derivatives and their respective acids.

In a preferred embodiment, compound E is an anhydride, more preferably phthalic anhydride. The use of anhydride instead of carboxylic acids has an advantage that no water is formed during the reaction.

Compound E can also be an ethylenically unsaturated carboxylic acid or anhydride. Examples include maleic anhydride, citraconic anhydride, tetrahydrophthalic anhydride, and (alkyl) derivatives thereof, e.g. 2,3-dimethylmaleic anhydride, and their respective acids. The use of an ethylenically unsaturated compound E may contribute to a higher crosslinking density and hence better properties of the coating after curing. More preferably, compound E is an ethylenically unsaturated anhydride e.g. maleic anhydride.

Skilled person is able to determine suitable conditions for the synthesis reaction (a). Typically, the synthesis is done in an inert atmosphere, under strong stirring.

The temperature during the synthesis is typically in the range 80-150° C. Conventional catalyst can be used, although not absolutely necessary. The progress of the reaction is monitored by analyzing the acid value over time. The reaction is preferably stopped when the acid value is below 55 mg KOH/g, preferably in the range 10-50 mg KOH/g.

The molar ratio of compound D to compound E is preferably from 1:5 to 5:1, more preferably from 1:3 to 3:1. In some embodiments, it can be preferred that compound D is used in the same molar amount as compound E. Without wishing to be bound by theory, it is believed that during this reaction compounds D and E form one or more polyester chains of alternating units, i.e. (D-E) units, which are coupled to the initial perfluoropolyether block A through multifunctional compound B. The chains of repeating units (D-E) preferably have a length of 1-12.

The resulting carboxyl-functional, unsaturated polyester F preferably has a weight average molecular weight Mw in the range 1,000-10,000, more preferably in the range 2,000-7,000, as determined by gel permeation chromatography (GPC) using a polystyrene standard with tetrahydrofuran as the mobile phase. The polyester preferably has an acid value in the range 10-50 mg KOH/g. The acid value can be measured by potentiometric titration, e.g. in accordance with DIN EN ISO 3682. Preferably, the resulting polyester F does not have OH functionality. The hydroxyl value is preferably <5 mg KOH/g, more preferably 0 mg KOH/g. The hydroxyl number can be measured by potentiometric titration using the TSI method, e.g. according to ASTM E1899-08.

Step (b)

In the step (b), carboxyl-functional, unsaturated polyester F is neutralized with a neutralizer G and dispersed in water. Neutralizer G can be ammonia or a tertiary amine, or a mixture of amines.

Neutralizer G is preferably a saturated tertiary amine, e.g. triethylamine, tripropyl amine, triethanolamine, diethylenetriamine, methylamine and N,N-dimethyl ethanol amine (DMEA). Preferably, DMEA is used. Advantages of the use of a saturated tertiary amine, such as DMEA, is that the resulting polymer is better dispersible in water.

Neutralizer G can also be an ethylenically unsaturated tertiary amine, particularly, a tertiary amine with a (meth) acrylate functionality. Examples of these include 2-(diethylamino)ethyl acrylate, 2-(diethylamino)ethyl methacrylate, 2-(dimethylamino)ethyl acrylate, 2-(dimethylamino)ethyl methacrylate, t-butylaminoethyl acrylate, t-butylaminoethyl methacrylate. Preferably, neutralizer G comprises 2-(dimethylamino)-ethyl-methacrylate or 2-(dimethylamino)-ethyl-acrylate. Unsaturated amines may contribute to a higher crosslinking density of the coating composition, thereby improving physical properties of the coating.

Neutralizer G is preferably added in an amount to achieve a neutralization degree of 20-150%, more preferably 80-120% of the carboxylic groups of the polyester F, calculated as the molar ratio of the base groups from the neutralizer and the carboxylic groups from polyester F.

The resulting dispersion preferably has a pH in the range 7-10. The solid content is preferably in the range 10-50 wt. %.

The obtained aqueous dispersion of polyester F can be used in preparation of coating compositions. If desired, the solvent used during the synthesis can be removed from the dispersion by known methods, e.g. by distillation.

Coating Composition

In another aspect, the present invention provides a waterborne, UV curable coating composition comprising the above-described dispersion of unsaturated polyester F and optionally at least one photoinitiator.

The unsaturated polyester F can be used alone or in combination with other polymers in the coating composition.

The unsaturated polyester F can be present in an amount from 0.1 to 90 wt. %, or from 1 to 80 wt. %, or from 3 to 70 wt. %, based on the total solid weight of the coating composition. In some embodiments, it can be preferred to use 20 to 90 wt. %, or 30 to 80 wt. % of the unsaturated polyester F based on the total solids weight of the coating composition. In other embodiments, it can be preferred to only use small amounts of the unsaturated polyester, e.g. 0.1-20 wt. %, or 1-15 wt. %, based on the total solids weight of the coating composition.

The coating composition can comprise other binder resins, e.g. polyesters, polyurethanes, (meth)acrylates. In a preferred embodiment, the coating composition further comprises at least one (meth)acrylate monomer, oligomer or polymer different from polyester F. The (meth)acrylate polymer can for example be a polyurethane (meth)acrylate or polyester (meth)acrylate.

The coating composition can also comprise copolymerizable monomers and oligomers. Examples of such monomers include (meth)acrylate monomers, particularly methyl (meth)acrylate, ethyl (meth)acrylate, isopropyl (meth)acrylate, butyl (meth)acrylate, isobutyl (meth)acrylate, ethyl hexyl (meth)acrylate, dipentaerythritol hexaacrylate, acrylonitrile, methacryl amide. Also vinyl monomers can be used, e.g. vinyl acetate, vinyl propionate, vinyl butyrate, styrene.

Preferably, the coating composition comprises at least one photoinitiator or a mixture thereof. Photoinitiators generate free radicals when exposed to radiation energy. Any suitable UV photo-initiator known in the art can be used. Suitable photoinitiators include benzoin derivatives, benzile ketales, α-hydroxyalkylphenones, monoacylphosphine oxide (MAPO) and bisacylphosphine oxides (BAPO), such as diphenyl(2,4,6-trimethylbenzoyl)phosphine oxide, 1-hydroxy-cyclohexyl-phenyl-ketone, bis(2,4,6-trimethylbenzoyl)-phenylphosphineoxide, bis(2,6-dimethoxybenzoyl)-2,4,4-trimethylpentyl-phosphine oxide, 2-hydroxy-2-methyl-1-phenyl-propan-1-one, 2-methyl-1[4-(methylthio)phenyl]-2-morpholono-propan-1-one, a phenyl glyoxylic acid methyl ester. Mixtures of these compounds may also be employed. Photoinitiators are commercially available, e.g. from IGM Resins.

The photoinitiator is preferably present in amount of from 0.1 to 10 wt. %, for example from 0.5 to 5.0 wt. % or from 0.5 to 2.5 wt. %, based on the total weight of the composition.

The coating composition is waterborne. Waterborne coating compositions comprise water as the major liquid phase when preparing and/or applying the coating composition. "Major liquid phase" means that water constitutes at least 50 wt. % of the liquid phase, preferably at least 80 wt. %, more preferably at least 90 wt. %, in some embodiments even 100 wt. %. The coating composition preferably contains 20 to 80% by weight of water, based on the total weight of the coating composition.

Optionally, the coating composition can in addition contain organic solvents. For example, organic solvents can be present in up to 50%, preferably, up to 40% by weight of the liquid phase. It may be preferred in some embodiments that the coating composition contains less than 10 wt. % of organic solvents, or even does not contain organic solvents, based on the total weight of the coating composition.

Example of suitable organic solvents include alcohols (such as ethanol, isopropanol, n-butanol, n-propanol), esters (such as ethyl acetate, propyl acetate), aromatic solvents (such as toluene), ketone solvents (such as acetone, methyl ethyl ketone, methyl isobutyl ketone, cyclohexanone, diacetone alcohol); aliphatic hydrocarbons; chlorinated hydrocarbons (such as $CH_2Cl_2$); ethers (such as diethyl ether, tetrahydrofuran, propylene glycol monomethyl ether) and mixtures thereof.

Preferably, the solvent is water-miscible. Preferred organic solvents include butyl acetate, methyl isobutyl ketone (MIBK), methyl ethyl ketone (MEK), propylene glycol monomethyl ether and methoxy propyl acetate (PMA), or mixtures thereof.

The solid content of the coating composition according to the invention can be in the range from 1 to 90 wt. %, preferably 5 to 65 wt. %, more preferably 10 to 50 wt. %.

The coating composition can further comprise conventional additives, such as fillers, antioxidants, matting agents, pigments, abrasion resistant particles, flow control agents, surfactants, plasticizers, adhesion promotors, thixotropic agents, light stabilizers and others.

The present invention further provides a method of coating a substrate, comprising applying the coating composition according to the invention to a substrate and curing the coating composition by means of UV radiation.

The coating composition can be applied onto a wide range of substrates by conventional techniques including spraying, rolling, blade-coating, pouring, brushing or dipping. After evaporation of the water and optionally organic solvents if present, the coating composition results in a coating that is dust-dry to slightly tacky.

Curing is then induced by means of UV radiation. Any suitable source of UV radiation can be used, e.g. Hg lamps, metal halide lamps, xenon lamps, UV-LED lamps. It is preferred to use UV-LED lamps. Skilled person is able to determine suitable conditions for curing by UV radiation.

Curing of the coating composition can be done at ambient conditions, e.g. room temperature. Room temperature is understood here as from 15 to 30° C. The curing can also be accelerated by heating. The coated substrate can be heated to a temperature in the range 40-100° C., more preferably 50-80° C. Conventional methods can be used, e.g. placing in an oven. Heating is preferably done before or simultaneously with UV curing.

The coating composition according to the present invention can be applied to a wide range of substrates including metallic and non-metallic substrates. Suitable substrates include polycarbonate acrylonitrile butadiene styrene (PC/ABS), polycarbonate, polyacrylate, polyolefin, polyamide, polystyrene, polyamide, glass, wood, stone, aluminium, aluminium alloys, and the like.

The coating composition according to the present invention can be used as a single layer applied directly to the substrate, or in multilayer systems, e.g. as a primer, basecoat or clearcoat.

The coating composition according to the present invention can be used in various coating industries, such as, consumer electronics, automotive, packaging, wood flooring and furniture, home appliance, glass and windows, sports equipment.

The present invention further provides a substrate coated with the coating obtained from the coating composition of the invention. The coatings according to the present invention have exceptionally good general properties including adhesion and abrasion resistance. In addition, the coatings also have excellent easy clean properties as can be tested with a permanent marker pen.

EXAMPLES

The invention will be demonstrated with reference to the following examples. All parts and percentages are by weight unless specified otherwise.

Fluorolink E10H—hydroxyl-functional PFPE polymer from Solvay

TMA—trimellitic anhydride from Shanghai Macklin Biochemical

MAH—maleic anhydride from Shanghai Aladdin

GMA—glycidyl methacrylate from Dow Chemical Company

Example 1. Preparation of Polyester Dispersion

A mixture of 10 g dibutyltin dilaurate, 5506 g 2-acetoxy-1-methoxypropane, 1700 g Fluorolink® E10H and 384 g TMA are added to a reactor, stirred and heated to 120° C. under nitrogen atmosphere. The reaction is allowed to proceed until the acid value is 29.5. Thereafter 908 g of MAH is added to the mixture. The temperature is set to 110° C. 1420 g of GMA is dosed to the reaction mixture and the reaction proceeds at the set temperature until the acid value is 22.5. The reaction mixture is cooled down to 40° C. The obtained polymer has an Mn of 4484, acid value of 22.5, and an OH value less than 5 mg KOH/g.

To the 100 g of the polyester, dispersion 3.6 g of DMEA and 90 g of water were added. The pH of the dispersion was 8.5 and the solid content was 25%.

Example 2. Preparation of a Coating Composition 10 g of solvent propylene glycol monomethyl ether and 2 g of the dispersion prepared in Example 1 are added to 83 g of a base resin dispersion (50% solid content emulsified dipentaerythritol hexaacrylate in water), 4 g of photoinitiator 1-hydroxy-cyclo-hexyl-phenyl-ketone and 1 g of photoinitiator diphenyl(2,4,6-trimethylbenzoyl)phosphine oxide.

Example 3. Tests

The coating composition prepared in Example 2 was sprayed on a PC/ABS panel and dried at 60° C. for 10 min to reach the dry film thickness of 20-30 micron. The coated panels were further subjected to UV curing using LED UV curing system RW-UVA301-30 from Run Wing M&E, energy dose 1100 mJ/cm².

For the easy clean testing, a ZEBRA brand permanent marker pen is used. The pen is used to write on the coated surface. The ink does not stick to the surface and can be easily wiped off with a cloth.

Abrasion resistance is tested usinga Model 5750 TABER® Linear Abraser. The test is performed with 1 kg of weight put on the steel wool, which is put on the coated panel. Abrasion speed is set at 60 cycle/minute, total 200 cycles. After the test, the above test with a permanent marker pen is repeated. The coating has retained the easy-clean property.

The invention claimed is:

1. An aqueous dispersion of a carboxyl-functional, unsaturated polyester containing a perfluoropolyether block prepared by the following steps:
    a) subjecting a carboxyl-terminated perfluoropolyether C to a reaction with an ethylenically unsaturated epoxy-functional compound D in the presence of compound E, wherein compound E is a carboxylic acid or anhydride with functionality of at least 2, to obtain carboxyl-functional, unsaturated polyester F,
    b) neutralizing carboxyl-functional, unsaturated polyester F with a neutralizer G and dispersing it in water,
    wherein the carboxyl-terminated perfluoropolyether C is prepared by subjecting a hydroxy-terminated perfluoropolyether A to a condensation reaction with compound B, wherein compound B is a multifunctional carboxylic acid or anhydride with a functionality of at least 3.

2. The dispersion according to claim 1, wherein compound A has a general structure

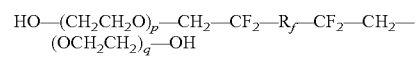

wherein p and q are integers independently chosen from 0 to 50, $R_f$ represents a bifunctional radical having perfluoropolyether structure $(CF_2CF_2O)_n$, $(CF_2O)_m$ or $(CF_2-CF_2-O)_n-(CF_2-O)_m$, and wherein n and m are integers independently chosen from 1 to 100.

3. The dispersion according to claim 1, wherein compound B is an anhydride.

4. The dispersion according to claim 3, wherein compound B is trimellitic anhydride or hydrogenated trimellitic anhydride.

5. The dispersion according to claim 1, wherein the carboxyl-terminated perfluoropolyether C has an acid value in the range 10-50 mg KOH/g.

6. The dispersion according to claim 1, wherein the ethylenically unsaturated epoxy-functional compound D is an epoxy-functional (meth)acrylate.

7. The dispersion according to claim 1, wherein compound E is an ethylenically unsaturated anhydride.

8. The dispersion according to claim 1, wherein neutralizer G is a tertiary amine with a (meth)acrylate functionality.

9. A waterborne, UV curable coating composition comprising the aqueous dispersion according to claim 1.

10. The coating composition according to claim 9, further comprising at least one (meth)acrylate monomer, oligomer or polymer different from carboxyl-functional, unsaturated polyester F.

11. The coating composition according to claim 9, further comprising an organic solvent in an amount less than 10 wt. %, based on the total weight of the coating composition.

12. A method of coating a substrate, comprising applying the coating composition according to claim 9 to a substrate and curing the coating composition by means of UV radiation.

13. A coated substrate obtained according to the method of claim 12.

14. The substrate according to claim 13, wherein the substrate is selected from the group consisting of polycarbonate acrylonitrile butadiene styrene (PC/ABS), polycarbonate, polyacrylate, polyolefin, polyamide, polystyrene, glass, wood, aluminum, and aluminum alloys.

15. An aqueous dispersion of a carboxyl-functional, unsaturated polyester containing a perfluoropolyether block prepared by the following steps:
 a) subjecting a carboxyl-terminated perfluoropolyether C to a reaction with an ethylenically unsaturated epoxy-functional compound D in the presence of compound E, wherein compound E is a carboxylic acid or anhydride with functionality of at least 2, to obtain carboxyl-functional, unsaturated polyester F,
 b) neutralizing carboxyl-functional, unsaturated polyester F with a neutralizer G and dispersing it in water, wherein neutralizer G is a tertiary amine with a (meth)acrylate functionality.

* * * * *